(12) United States Patent
Grottke et al.

(10) Patent No.: US 11,124,245 B2
(45) Date of Patent: Sep. 21, 2021

(54) SILL OF A VEHICLE BODY, VEHICLE BODY AND METHOD OF MANUFACTURING A VEHICLE BODY

(71) Applicant: Benteler Automobiltechnik GmbH, Paderborn (DE)

(72) Inventors: Stefan Grottke, Rheine (DE); Stefan Schmitz, Bielefeld (DE); Rodscha Drabon, Salzkotten (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 171 days.

(21) Appl. No.: 16/671,349

(22) Filed: Nov. 1, 2019

(65) Prior Publication Data

US 2020/0140021 A1    May 7, 2020

(30) Foreign Application Priority Data

Nov. 2, 2018 (DE) .......................... 102018127375.4

(51) Int. Cl.
| | | |
|---|---|---|
| *B62D 25/20* | (2006.01) | |
| *B62D 65/06* | (2006.01) | |
| *B62D 27/02* | (2006.01) | |
| *B62D 27/06* | (2006.01) | |
| *B62D 21/09* | (2006.01) | |

(52) U.S. Cl.
CPC ......... *B62D 25/2036* (2013.01); *B62D 21/09* (2013.01); *B62D 27/023* (2013.01); *B62D 27/026* (2013.01); *B62D 27/06* (2013.01); *B62D 65/06* (2013.01)

(58) Field of Classification Search
CPC .. B62D 25/2036; B62D 65/06; B62D 27/023; B62D 27/026; B62D 27/06; B62D 21/09; B62D 25/025; B62D 21/157; B62D 24/00; B62D 25/00; B62D 25/02; B62D 65/02; B62D 29/005; B60Y 2306/01; B60K 2001/0438; B60K 1/04; C09J 2400/163; C09J 5/00; F16B 11/008
USPC .......................................................... 296/209
See application file for complete search history.

(56) References Cited

U.S. PATENT DOCUMENTS

| | | | |
|---|---|---|---|
| 9,505,442 B2 | 11/2016 | Wu et al. | |
| 2013/0062912 A1* | 3/2013 | Zornack | B62D 25/00 296/209 |

(Continued)

FOREIGN PATENT DOCUMENTS

| | | |
|---|---|---|
| DE | 102009015637 A1 | 10/2010 |
| DE | 102015219922 A1 | 4/2016 |
| DE | 102016103371 A1 | 9/2016 |

*Primary Examiner* — Pinel E Romain (57) ABSTRACT

The present invention relates to a sill of a vehicle body (1), comprising a lower sill part (5) and an upper sill part (6) placed on and attached to the lower sill part (5). The sill is characterized in that the upper sill part (6) is part of a vehicle superstructure (3), in that in one side of a first sill part (5, 6), which faces the further sill part (6, 5), a recess (7) and, on one side of the further sill part (6, 5), which faces the first sill part (5, 6), a protrusion (61) is provided, wherein the shape of the recess (7) corresponds to the shape of the protrusion (61) and the protrusion (61) interlocks form-fittingly in the recess (7). In addition, the invention relates to a vehicle body (1) with two sills (4) and a method of manufacturing such a vehicle body.

18 Claims, 4 Drawing Sheets

(56) References Cited

U.S. PATENT DOCUMENTS

| | | | |
|---|---|---|---|
| 2013/0140854 A1* | 6/2013 | Mori | B62D 25/025 296/209 |
| 2013/0264840 A1* | 10/2013 | Izumi | B62D 25/025 296/187.12 |
| 2016/0114699 A1 | 4/2016 | Hokazono et al. | |
| 2017/0305250 A1* | 10/2017 | Hara | B60K 1/04 |
| 2020/0140018 A1* | 5/2020 | Grottke | B60K 1/04 |
| 2021/0122222 A1* | 4/2021 | Meckenstock | B62D 25/20 |

* cited by examiner

SILL OF A VEHICLE BODY, VEHICLE BODY AND METHOD OF MANUFACTURING A VEHICLE BODY

The present invention relates to a sill of a vehicle body, a vehicle body comprising such a sill and a method of manufacturing a vehicle body.

In the production of vehicles it is known to divide the vehicle body into modules. For example, from EP 2 463 181 B1 a method for manufacturing a motor vehicle is known. Here, a chassis is used which comprises the vehicle frame, a floor as well as the drive train and running gear to which superstructure module assemblies are attached. The superstructure module assemblies may include sidewall carcasses. The superstructure module assemblies can be attached to the chassis by gluing or screwing, for example.

A disadvantage of this vehicle body is that the connection between the chassis and the superstructure module assemblies must be made depending on the design of the individual superstructure module assemblies and forces which occur, for example, in a side impact can only be absorbed by the vehicle frame.

The object of this invention is therefore to create a solution with which a reliable connection between a vehicle frame and the vehicle superstructure can be created while still providing reliable protection in the event of a side impact, in particular a pole impact.

The invention is based on the finding that this problem can be solved by constructing at least the sill of the vehicle body in two parts, consisting of a part which is part of the vehicle superstructure and a part which is part of the vehicle frame, and that the sill parts are connected to each other via a defined interface.

According to a first aspect, the invention relates to a sill of a vehicle body. The sill comprises a lower sill part and an upper sill part which is placed on and attached to the lower sill part. The sill is characterized in that the upper sill part is part of a vehicle superstructure, in that in one side of a first sill part facing the further sill part a recess and at one side of the further sill part facing the first sill part a protrusion is provided, wherein the shape of the recess corresponds to the shape of the protrusion and the protrusion interlocks with the recess.

A sill is in particular a part of the substructure of a vehicle body. According to the invention, the vehicle body comprises at least a vehicle frame and a vehicle superstructure. In particular, the vehicle superstructure may comprise a floor with seat cross beams as well as a pillar structure such as the A, B and C pillars, the front body, the rear body and the roof construction. The sill is located in the lateral area of the passenger compartment. The sill can therefore also be referred to as the side sill. The sill extends in the longitudinal direction of the vehicle and thus also in the longitudinal direction of the vehicle body. The sill is at least partially formed by a part of the vehicle frame of the vehicle body. The sill lies in the longitudinal direction of the vehicle body between the A-pillar and the C-pillar of the vehicle body, in particular longitudinally below the door entrance of the vehicle superstructure.

The sill parts are preferably made of closed hollow profiles and especially preferably of multi-chamber profiles. However, it is also within the scope of the invention that at least one of the sill parts consists of a plate with only one profile chamber formed onto it. Furthermore, at least one sill part can be a plate with an embossed recess. The sill parts can, for example, be extruded profiles or expressions, respectively, and can consist, for example, of one or more aluminium alloys.

According to the invention, the sill comprises a lower sill part and an upper sill part which is placed and fixed onto the lower sill part.

Directions such as vertical, horizontal, top and bottom refer, unless otherwise indicated, to the sill or to the vehicle body, respectively, in a mounted state. In the context of the invention, the horizontal direction is to be understood in such a way that it runs approximately parallel to the road surface, but may well be inclined by a few degrees. In particular, horizontal means an inclination to the road surface of no more than 10 degrees. Vertical also means that this direction is approximately perpendicular to the horizontal direction, but can again be inclined by a few degrees, especially not more than 10 degrees.

As applied to the lower sill part is understood an upper sill part, whose underside lies at least partially on the upper side of the lower sill. Preferably the width of the upper sill part, at least in the area where it rests on the lower sill part, is equal to the width of the lower sill part, in the area where the upper sill part rests on the lower sill part.

According to the invention, the upper sill part is attached to the lower sill part. This fastening is preferably made via the contact surface of the two sill parts.

The sill according to the invention is characterized in that the upper sill part is part of a vehicle superstructure. The upper sill part is for example formed by the lower part of a side wall of the vehicle superstructure in the area of the door entrances. According to the invention, the upper sill part, however, can also be a separate component that is connected, for example screwed, welded or adhesively connected to a part of the vehicle superstructure, for example a side wall.

In addition, the sill according to the invention is characterized in that in one side of a first sill part, which faces the further sill part, a recess is provided and on one side of the further sill part, which faces the first sill part, a protrusion is provided. The recess and the protrusion extend in a vertical direction. The recess and the protrusion are arranged on the respective sill part in such a way that they are aligned with each other in the assembled state. The protrusion can therefore mate with, i.e. be inserted into the recess. The position of the recess on one sill part is thus aligned horizontally with the position of the protrusion on the other sill part. For example, the recess and the protrusion may be located in the middle of the width of the respective side of the sill facing the other sill. The side of the sill part facing the other sill part which and in the assembled state being in contact with the other sill part is referred to below also as the contact surface. In the following, the contact surface is also referred to as the adhesion surface.

According to the invention, the shape of the recess also corresponds to the shape of the protrusion. Preferably, the shape of the recess represents a negative shape to the shape of the protrusion. The protrusion interlocks with the recess. Preferably, the entire surface of the protrusion is in contact with the surface of the recess and thus fills it. The mating of the protrusion with the recess can be tension-free. However, it is also within the scope of the invention that the protrusion is held force-fit in the recess in addition to the interlocking fit, e.g. is pressed into the recess.

The recess, for example, can have a V-shaped, a U-shaped or a semi-circular cross-section or be a deeply grooved notch.

According to the invention, also several protrusions and several recesses can be provided, wherein then preferably also one protrusion is aligned with one recess and interlocks with it. It is also possible for both a protrusion and a recess to be provided on a sill part. In this case, a protrusion and a recess are also provided on the other sill part. For a better understanding, essentially only sill parts are described in the following, of which one has a recess and one a protrusion.

By, according to the invention, the sill consisting of an upper and a lower sill part, the upper sill part of which is part of the vehicle superstructure, and the sill parts having at least one recess and a protrusion interlocking by mating with the recess, a number of advantages can be achieved.

On the one hand, the structure of the vehicle body is simplified. In particular, the protrusion and recess can be used to connect or at least pre-fixate the two sill parts. This connection also creates a connection between the vehicle frame and the vehicle superstructure. At least with regard to the forces acting on the vehicle body from the side, the connection prevents by means of protrusion and recess a horizontal movement of the vehicle superstructure in relation to the vehicle frame. In addition, the specific provision of recess and protrusion at the respective sill parts creates a defined interface via which the vehicle superstructure can be connected to the vehicle frame. Therein, the shape and design of the vehicle superstructure is independent of the interface. Thus, for example, a vehicle superstructure for a Sport Utility Vehicle (SUV) can be mounted on the same vehicle frame as the vehicle superstructure for a so-called people mover with lower access. This simplifies the manufacturing of the vehicle body. In addition, the provision of a protrusion and recess increases the area through which the upper sill part is in contact with the lower sill part. This contact surface can serve as a fastening surface, for example as an adhesion surface, or as a surface for inserting fastening elements such as rivets. By increasing this surface by providing a recess and protrusion, the connection between the upper and lower sill parts is also improved. Finally, the advantage of providing a recess with an interlocking protrusion is that it increases the stability of the sill. In particular, the bending stiffness of the sill in the horizontal direction is increased. It can therefore better withstand a side impact, in particular a pole crash.

According to an embodiment, the protrusion at the sill part is formed by a hollow chamber. As already mentioned, the sill parts can represent multi-chamber profiles. Alternatively, the sill part can also represent a plate with a hollow chamber formed onto it. If during the manufacturing of the sill part, on which a protrusion is formed, the protrusion is formed by a hollow chamber, on the one hand the manufacturing of the sill part is simplified. In particular, the shape of the protrusion can be specifically adjusted and the wall thickness of the chamber that forms the protrusion can also be adjusted. On the other hand, the protrusion can also be post-treated, for example by calibration. In addition, the weight of the sill part on which the projection is provided is not or only slightly higher when the protrusion is designed as a hollow chamber than with a sill part without a protrusion.

The recess and the protrusion preferably extend in the longitudinal direction of the sill. The advantage of this embodiment is that the contact surface between the two sill parts can be maximized. Preferably, the recess and protrusion extend over the entire length of the sill. This embodiment is advantageous because the recess and the protrusion in the case of a hollow profile, in particular a multi-chamber profile, can thus be formed during profile production and do not have to be subsequently worked on or inserted into the respective sill part.

According to one embodiment, the sides of the sill parts, in which the recess and on which the protrusion are provided, are horizontal. This allows the respective side, for example the upper side of the lower sill part and the lower side of the upper sill part, which lie in the horizontal plane, in the event of a side crash to absorb a certain amount of the force acting on the sill or at least to prevent the sill from kinking. The sides in which the recess and the protrusion are provided are, for example, flat surfaces. This further simplifies the manufacturing of the sill, as the die for producing a sill part by extrusion has a less complex cross-section.

According to an alternative embodiment, the recess and the protrusion extend over the entire width of the respective sill part. The width of the sill part is defined as its dimension in the width direction of the vehicle in the area of the contact surface. In this embodiment, for example, the entire upper side of the lower sill part can be a recess and the entire underside of the upper sill part a protrusion. This means that the contact surfaces are formed by the protrusion and the recess alone and the size of the contact surfaces is thus increased.

According to an embodiment, the recess is provided in the upper side of the lower sill part and the protrusion is provided in the lower side of the upper sill part. The advantage of this embodiment is that the height of the upper sill part, which forms part of the vehicle superstructure, may be small. This means that also vehicle superstructures can be used which must have a low entry height in the door area, such as, for example, a people mover, and can be placed on the same vehicle frame used for an SUV for example. In addition, with this embodiment, the contact surface between the protrusion and recess is in the area of the lower sill part. Since this sill part is usually subjected to high forces in the event of a side impact with a pole, the protrusion and the shape of the recess can provide stiffening in this area and can further increase safety. However, it is also within the scope of the invention that the protrusion is formed on the lower sill part and the corresponding recess is formed on the upper sill part.

According to a preferred embodiment, the upper and lower sill parts lie against each other over the entire surface of the side facing the other sill part. With this embodiment, the width of the two sill parts is the same in the area of the contact surface.

According to a preferred embodiment, the upper and lower sill parts are adhesively connected together. An adhesive layer is preferably applied between the upper and lower sill parts. This adhesive layer can be applied to the side of one of the sill parts facing the other sill part before the other sill part is applied. Alternatively, the adhesive layer can also be applied to both sides of the sill parts facing each other. According to an embodiment, at least one sill part has at least one fastening lug when the sill parts are connected by adhesive bonding. The fastening lug(s) are preferably at a distance from the contact surface via which the sill parts are adhesively connected together. In particular, the fastening lug or the fastening lugs may be provided on the outside of the sill parts, which is directed outwards in the assembled state of the vehicle. For example, a fastening lug may be provided on the outside of the lower sill part and extend in the width direction of the vehicle. Alternatively, an arrangement of the fastening lug on the inner side of the lower sill part can also be useful if this is possible in terms of installation space and accessibility. By providing fastening lugs, the sill parts can be pre-fixated to each other. In particular, at least during the hardening of the adhesive, the relative position of the two sill parts can be fixed. Via the fastening lug(s) the sill parts can be screwed together or locked together.

Preferably the sides of the sill parts facing each other represent the adhesion surface. Particularly preferred also the area in which the projection and recess abut against each other, is part of the adhesion surface.

Preferably the adhesive layer extends over the entire contact surface of the two sill parts. Thus, the adhesive layer preferably extends over the recess and the protrusion. By increasing the contact area, also the adhesive surface can be increased, thus improving the hold between the two sill parts. A cold-hardening adhesive is preferably used as the adhesive for gluing the two sill parts together. For example, a cold-hardening two-component structural adhesive can be used. Since the sill parts are adhesively connected together using adhesive, in particular cold-hardening adhesive, there is no risk of distortion which can occur with a thermal connection, e.g. welding. Compared to a rivet or screw connection, the production of an adhesive layer is easier and the sill can therefore be manufactured more quickly.

According to an embodiment, on the side of one of the sill parts facing the other sill part, a spacer is formed. The spacer is an elevation from the side of the sill part, the height of which is selected so that the free end of the elevation is in contact with the other sill part in the state in which the protrusion is inserted into the recess. In particular, when the sill parts are connected by adhesive bonding, the adhesion gap between the sill parts can be adjusted and maintained by means of the spacer. This prevents the adhesive from being squeezed out. Several spacers can be provided distributed over the contact surface, and in particular over the adhesion surface between the sill parts, so that the height of the adhesion gap can be guaranteed over the entire adhesion surface. The spacer or the spacers may extend over the entire length of the sill part. With this embodiment, the spacer can be formed as an extruded extension and thus be formed by extrusion during the manufacturing of the sill part.

According to an embodiment, the lower sill part consists of an inner and an outer sill profile, which are preferably connected to each other by adhesive connection which at least partially extends vertically and a snap-in connection. For example, snap-in arms can be provided on one of the sill profiles, which interlock with the snap-in receiving sections in the form of grooves on the other sill profile. The snap-in arms and snap-in receiving sections are preferably located close to the adhesion surface over which the sill profiles are adhesively connected to each other. An advantage of a two-part lower sill part is that the sill profiles can be made from different materials, for example different aluminium alloys.

In particular, the materials of the inner and outer sill profiles may have different strengths in relation to each other. For example, the outer sill profile with lower strength can serve as a deformation zone in the event of a crash. Here the impact energy is converted into deformation energy and thus absorbed in the outer sill profile. The inner sill profile, on the other hand, can prevent the sill from kinking or from an object such as a pole penetrating through due to a higher strength. By the connection of the two sill profiles, which is preferably carried out both by gluing and by snap-in, the hold of the sill profiles onto each other can be ensured and the lower sill part with the different strengths can be manufactured nevertheless in a simple way. If the sill profiles are connected to each other after the adhesive has been applied to the connection surface(s) via the snap-in connection, the correct alignment of the sill profiles to each other can be ensured by the snap-in connection already during the hardening of the adhesive. In addition, the adhesive connection between the sill profiles is supported by the snap-in connection also in the event of a crash. By the connection both by means of snap-in elements and by means of adhesive, the hold of the sill profiles together can still be guaranteed even in the event of deformation of the outer sill profile. In addition, the use of an adhesive connection and a snap-in connection is advantageous over a connection using separate fastening elements, such as screws or rivets, as the number of parts required to produce the lower sill part is reduced. In addition, the manufacturing time is reduced, as the snap-in arms(s) can be snapped-in simultaneously with the corresponding snap-in receiving sections and thus only one step is required to establish the snap-in connection.

According to an embodiment, the recess is formed in the lower part of the sill by bevels on the inner and outer sill profile. The bevels are located in the upper part of the inner and outer sill profile above the connecting surface of the two sill profiles.

In this embodiment, the recess has a V-shape or trapezoidal shape. This embodiment is particularly advantageous because the cross section of the two sill profiles can be easily produced with a bevel. In addition, the recess can have a large depth without weakening the individual sill profiles. The large depth of the recess can improve the hold between the lower sill part and the upper sill part. This improvement is due to the larger overlap between the upper sill part and the lower sill part on the one hand and to the larger contact surface over which the upper sill part can be adhesively connected to the lower sill part or otherwise fastened on the other.

Since the hold between the first and the second sill profile is preferably given by both adhesive connection and snap-in connection, this is sufficient to prevent the sill profiles from being pushed apart by the weight of the upper sill part inserted into the recess and the vehicle superstructure mounted thereon.

According to another aspect, the invention relates to a vehicle body comprising at least a vehicle frame and a vehicle superstructure. The vehicle body is characterized by the fact that the vehicle body has two sills according to the invention. The sills are arranged in the area of the door entrance of the vehicle body and can also be referred to as door sills.

Preferably at least a part of the running gear of the vehicle is attached to the vehicle frame. Other components, such as the drive train, can also be attached to the vehicle frame. The vehicle frame, which can also be referred to as the ladder frame, with the attached components can also be referred to as the rolling chassis in this embodiment. Particularly preferably, the vehicle body is an e-mobility vehicle body.

Preferably the vehicle frame is adhesively connected to the vehicle body at least in the area of the lower sill part. In the area of the lower sill part the vehicle frame is adhesively connected to the upper sill part. In addition, preferably other parts of the vehicle superstructure are bonded to the vehicle frame. An adhesive layer can be applied to the upper side of the vehicle frame.

According to another aspect, the present invention relates to a method of manufacturing a vehicle body according to the invention. The process is characterized in that the vehicle superstructure is placed on the vehicle frame and the at least one protrusion is inserted into the at least one recess.

The insertion of the protrusion into the recess takes place, according to the invention, during the placing of the vehicle superstructure on the vehicle frame. In an embodiment, in particular, there may be a protrusion on the underside of the vehicle body at least in the area of the sill which protrudes downwards. This protrusion is aligned with the recess in the upper side of the vehicle frame and in particular of the lower sill part and the protrusion is inserted into the recess by lowering the vehicle superstructure onto the vehicle frame.

According to the invention, adhesive is applied to at least part of the contact surfaces of the vehicle superstructure and/or the vehicle frame before the vehicle superstructure is placed on the vehicle frame. Preferably the adhesive is applied at least in the area of the sill. The adhesive shall preferably be applied over the entire contact surface between the vehicle frame and the vehicle superstructure.

According to one embodiment, at least one of the sill parts is mechanically calibrated. Preferably the sill part is mechanically calibrated in the area of the protrusion. This can compensate for tolerances that may occur during the manufacturing of the sill part, especially during extrusion. For example, calibration can produce an outer wall parallelism in the area of the protrusion. Furthermore, a certain twisting of the sill part can be eliminated.

The calibration can be carried out using an inner mandrel and a two-piece press forming tool. The inner mandrel is moved into a sill part, in particular into a profile chamber, for example the hollow chamber of the protrusion, and two press tool halves are moved together around the sill part from the outside. The inner mandrel is moved in and the press forming tool halves are moved together for the purpose of plastic deformation of the sill part during and/or after the press forming tool halves are moved together.

According to an embodiment, at least the protrusion and/or recess is formed by hydroforming. The protrusion or recess formed in this way can also be treated by calibration, in particular mechanical calibration. This allows adhesive surfaces to be formed locally over the length and/or width of the sill part.

The advantages and features which are described with respect to the sill according to the invention shall, where applicable, apply mutatis mutandis to the vehicle body according to the invention and to the method according to the invention, and vice versa.

The present invention is explained again below with reference to the enclosed drawings.

Figure 1:
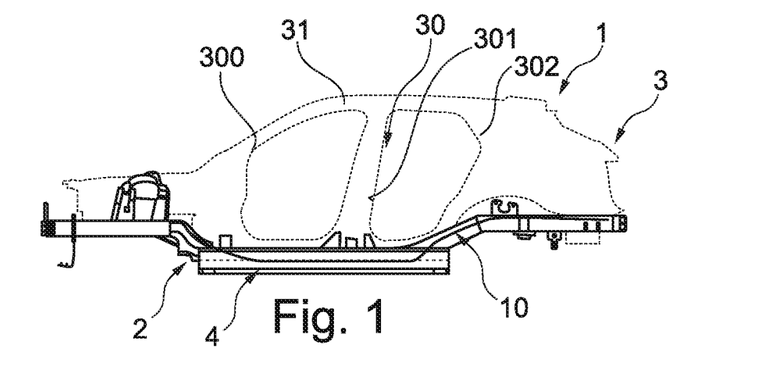
FIG. 1: shows a schematic side view of an embodiment of the vehicle body according to the invention.

FIG. 1 shows an embodiment of a vehicle body 1 according to the invention. The vehicle body 1 in the depicted embodiment consists of a vehicle frame 2 and a vehicle superstructure 3 mounted on the vehicle frame 2. The vehicle superstructure 3 comprises in the depicted embodiment a pillar structure 30, which has an A-pillar 300, B-pillar 301 and a C-pillar 302. In addition, the vehicle superstructure 3 has a roof structure 31 which is attached to or formed together with the pillar structure 30. The lower part of the vehicle superstructure 3 between the A-pillar 300 and C-pillar 302, i.e. in the area of the door cut-out, is referred to below as the upper sill part 6. The upper sill part 6 can be formed in one piece with the pillars 300, 301, 302 or the pillars 300, 301, 302 can be attached on the upper sill part 6. In the first case, the pillars 300, 301, 302, together with the upper sill part 6 and, if necessary, a longitudinal roof beam, form a side wall of the vehicle body 1.

Figure 2:
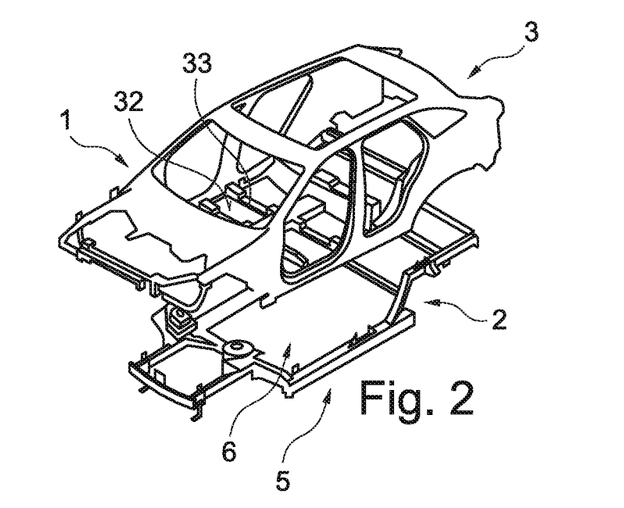
FIG. 2: shows a schematic exploded view of the embodiment of the vehicle body according to the invention as shown in FIG. 1.

As can be derived from FIG. 2, the vehicle superstructure 3 also comprises a floor element 32 arranged between the upper sill parts 6. In or on the floor element 32, seat cross beams 33 are provided which extend perpendicularly to the upper sill parts 6.

Figure 3:
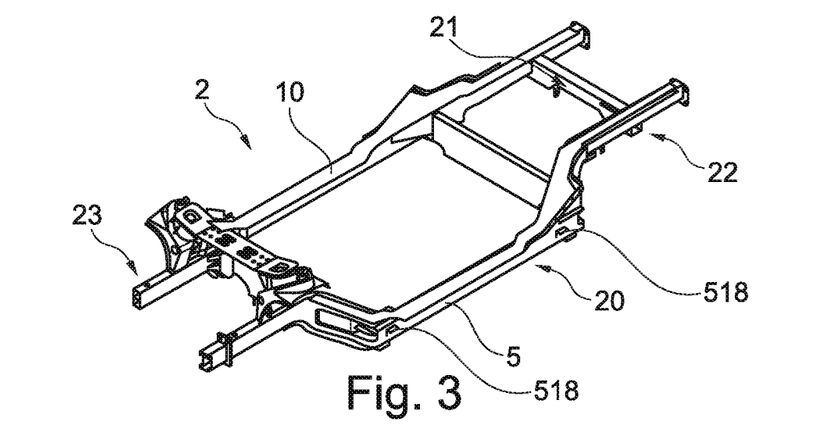
FIG. 3: shows a schematic perspective view of an embodiment of a vehicle frame for the vehicle body according to the invention.

The vehicle frame 2, which is shown in more detail in FIG. 3, comprises, in the depicted embodiment, two lower sill parts 5 which extend in the longitudinal direction of the vehicle frame 2 and form in the middle part of the length of the vehicle frame 2 the sides of the vehicle frame 2. The lower sill parts 5 are connected at their front end and rear end respectively with further frame parts of the vehicle frame 2 for the front superstructure and the rear superstructure of the vehicle. The connection in the depicted embodiment is a connection via nodes, which can be, for example, cast nodes.

FIG. 3 also shows two fastening lugs 518 on the lower sill part 5. The fixation lugs 518 protrude outwards from the outside of the lower sill part 5. These fixation lugs 518 can be used to fixate the vehicle body 3 to the vehicle frame and in particular to the lower sill part 5. In particular, the fixation lugs 518 can be used for pre-fixation, for example by screwing the vehicle body 3 to the vehicle frame 2. This pre-fixation is particularly advantageous for the duration of hardening of the adhesive by which the vehicle body 3 is connected to the vehicle frame 2.

Figure 4:
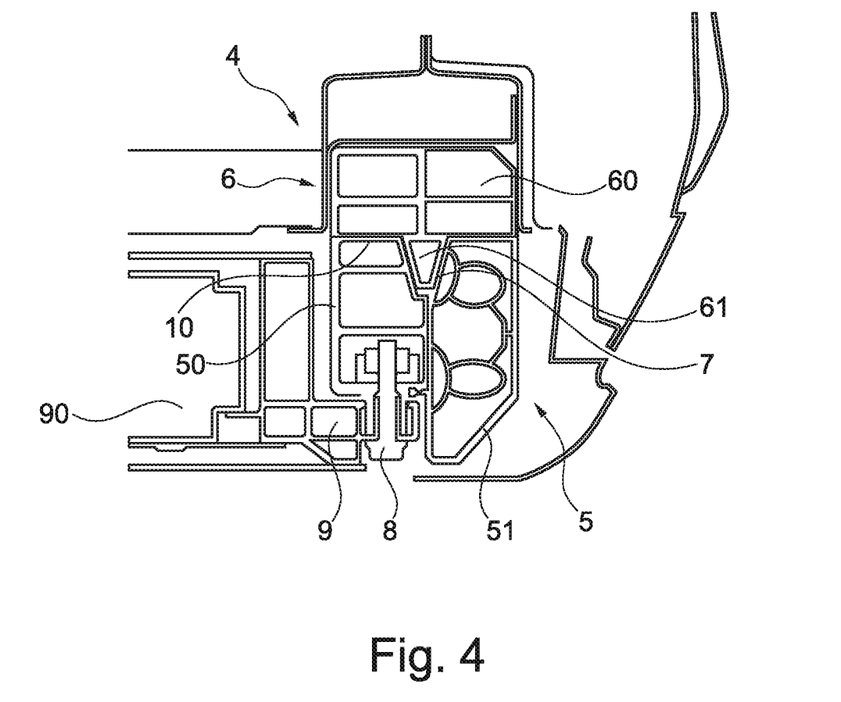
FIG. 4: shows a schematic cross-sectional view through an embodiment of a sill according to the invention.

FIG. 4 shows a schematic cross-section through an embodiment of a sill 4. The sill 4 consists of an upper sill part 6 and a lower sill part 5. The upper sill part 6 is part of the vehicle superstructure 3. In particular, the upper sill part 6 is the part of the vehicle superstructure 3 located in the lower part between the pillars 300, 301, 302 of the vehicle superstructure 3 on the sides of the vehicle body 1. The lower sill part 5 is a part of the vehicle frame 2. In particular, the lower sill part 5 represents the part of the longitudinal beam of the vehicle frame 2 which lies in the middle part of the longitudinal beam of the vehicle frame 2.

The upper sill part 6 represents a multi-chamber profile in the shown embodiment. The upper sill part 6 has a main body 60. In the main body 60 of the upper sill part 6, there are two partition walls in the horizontal and one partition wall in the vertical in the upper sill part 6, so that four profile chambers are formed in the main body 60 of the upper sill part 6 in the shown embodiment. The underside of the main body 60 of the upper sill part 6 represents a flat surface in the shown embodiment. However, a protrusion 61 is formed in the underside of the main body 60. In the shown embodiment, the protrusion 61 is arranged in the middle of the width of the main body 60 on the underside. The protrusion 61 is formed by a hollow chamber which is adjoined to the main body 60 below it. In the shown embodiment, the protrusion 61 lies below the vertical partition wall of the main body 60. The protrusion 61 has a trapezoidal cross-section, with the cross-section tapering downwards from the underside of the main body 60.

In the shown embodiment, further components are attached to the upper sill part 6 on the upper side. In particular, these can represent shielding components of the vehicle superstructure 3, such as sheet metal components.

The lower sill part 5 in the embodiment shown consists of two sill profiles 50, 51. The inner sill profile 50 is inseparably connected to the outer sill profile 51.

Figure 5:
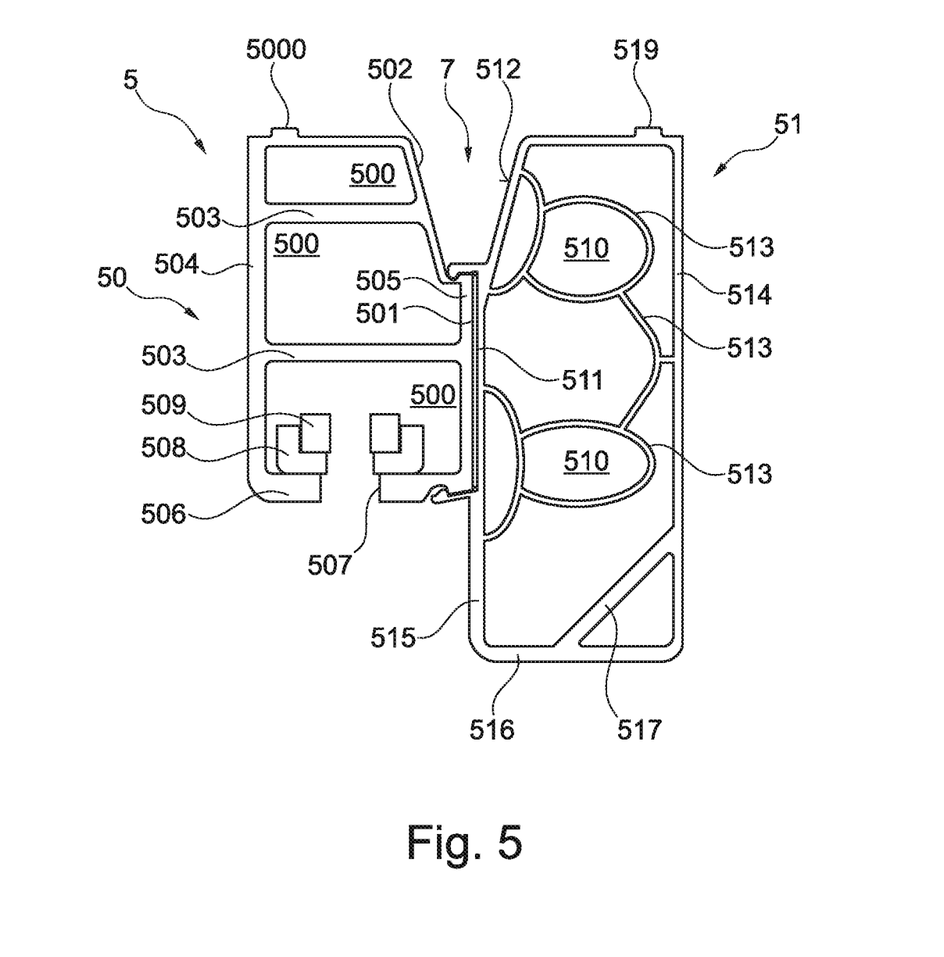
FIG. 5: shows a schematic detail view of the lower sill part of the sill according to the embodiment shown in FIG. 4.

The construction of the lower two-part sill part 5 is shown in FIG. 5.

The inner sill profile 50 is a multi-chamber profile. The partition walls 503 lie horizontally in the inner sill profile 50 and represent flat walls. In the shown embodiment the inner sill profile 50 has two partition walls 503 and thus three profile chambers 500, which are arranged one above the other. In the lower profile chamber 500 of the inner sill profile 50 there is a fastening rail 508. The fastening rail 508 rests on the bottom wall 506 of the inner sill profile 50. In the bottom wall 506, which can also be referred to as the floor, there is a passage opening 507 for the pass-through of a screw 8. The passage opening 507 is aligned with the screw hole of the fastening rail 508 and a screw sleeve 509 which is positioned on the fastening rail 508. The bottom wall 506 of the inner sill profile 50 has a greater wall thickness than the other walls and the partition walls 503 of the inner sill profile 50.

FIG. 4 shows that a battery holder 9 is attached to the inner sill profile 50 which is facing the centre of the vehicle frame 1. In particular, the battery holder 9 is screwed to the fastening rail 508 in the inner sill profile 50 using screws 8. The battery holder 9 represents a multi-chamber profile in the embodiment shown. FIG. 4 shows a drive battery 90 which is inserted into the battery holder 9.

The side walls 504, 505 of the inner sill profile 50 have different heights in the shown embodiment. The side wall 504, which faces away from the outer sill profile 51 and faces towards the centre of the vehicle frame 2 in the mounted state has a greater height than the second side wall 505, which faces towards the second sill profile 51. These different heights are due to a bevel 502 of the inner sill profile 50 which adjoins to the top of the side wall 505 via an inwardly oriented step and is inclined towards the first side wall 504.

The outer side of the second side wall 505, i.e. the side of the side wall 505 facing the second sill profile 51, forms in the depicted embodiment a connecting surface 501 of the inner sill profile 50.

In the step which is adjoined to the upper end of the second side wall 505 and thus to the connecting surface 501, a groove is provided in the upper side which extends in the longitudinal direction of the inner sill profile 50. The groove represents a snap-in receiving section for the snap-in connection with the outer sill profile 51. A further groove is provided in the underside of the bottom wall 506. This groove represents a further snap-in receiving section for the snap-in connection with the outer sill profile 51.

The outer sill profile 51 is also a multi-chamber profile. In the depicted embodiment the outer sill profile 51 represents a round hollow profile. The partition walls 513 of the outer sill profile 51 are designed as bent walls. Thus, mostly round profile chambers 510 are formed. In particular, the partition walls represent 513 partial oval sections.

The side walls 514, 515 of the outer sill profile 51 have different heights in the shown embodiment. The side wall 514, which faces away from the inner sill profile 50 and in the mounted state is located outside on the vehicle frame 2, has a greater height than the second side wall 515, which faces towards the inner sill profile 50. These different heights are due to a bevel 512 of the outer sill profile 51, which adjoins to the upper end of the side wall 515 and is tilted towards the first side wall 514.

At the upper end of the second side wall 515 a first snap-in protrusion is formed. This has a stem which extends outwards from the side wall 515 in the direction of the inner sill profile 50. On the underside of the snap-in protrusion, a snap-in nose is provided at the free end of the stem. A further snap-in protrusion is provided on the second side wall 515 of the outer sill profile 51, offset downwards at a distance from the first snap-in protrusion. The distance between the first snap-in protrusion and the second snap-in protrusion corresponds to the height of the side wall 505 of the inner sill profile 50. The second snap-in protrusion in the shown embodiment also has a stem and a snap-in nose at the free end of the stem. The snap-in nose of the second snap-in protrusion extends from the stem upwards. The area of the outer side, i.e. the side facing the inner sill profile 50, the second side wall 515 of the second sill profile 51 between the upper and lower snap-in protrusion forms the connecting surface 511 of the outer sill profile 51.

The snap-in noses of the snap-in protrusions mate with the grooves of the inner sill profile 50, which serve as snap-in receiving sections. Thus, the inner sill profile 50 and the outer sill profile 51 are connected via a snap-in connection.

Additionally, the adhesive gap formed between the connecting surfaces 511, 501 contains adhesive (not shown). The adhesive is applied to one or both connecting surfaces 511, 501 before the sill profiles 50, 51 are placed against each other and fixed to each other by means of the snap-in protrusions and snap-in receiving sections.

The bevels 502, 512 on the inner and outer sill profile 50, 51 form a recess 7 in the upper side of the lower sill part 5. The recess 7 has a V-shaped or trapezoidal cross-section.

The cross-section of the recess 7 corresponds to the cross-section of the protrusion 61 on the upper part of the sill 6.

On the upper side of the two sill profiles 50, 51 of the lower sill part 5, spacers 5000 and 519 are also provided in FIG. 5. The spacers 5000 and 519 protrude upwards and ensure that the adhesive is not pressed out when connecting the upper 6 and lower sill part 5.

As shown in FIG. 4, there is a layer of adhesive 10 in between the lower sill part 5 and the upper sill part 6, over which the upper sill part 6 and the lower sill part 5 are connected and held together.

Figure 6:
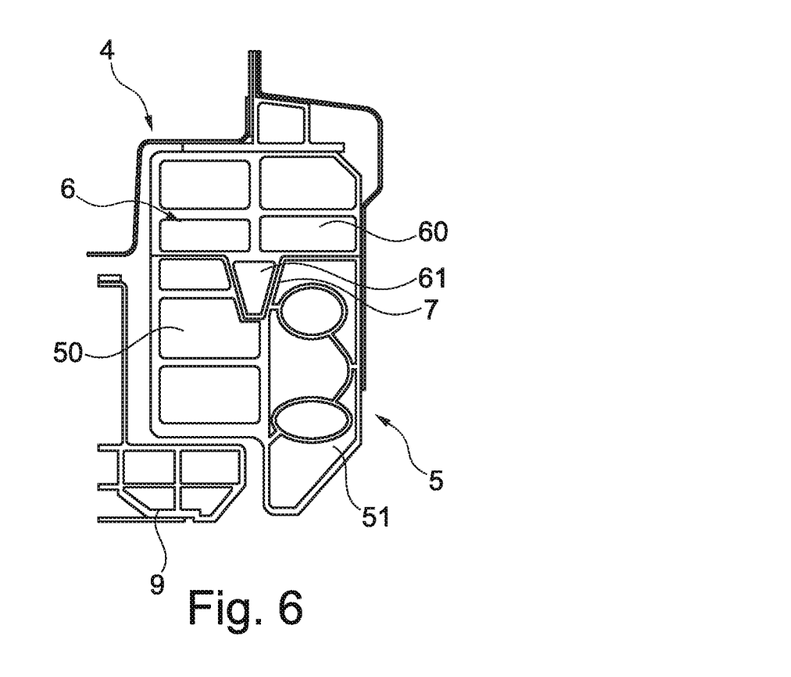
FIG. 6: shows a schematic cross-sectional view through a further embodiment of a sill according to the invention.

FIG. 6 shows a further embodiment of the sill 4 according to the invention in cross-section. This embodiment differs from the embodiment shown in FIG. 4 in that the lower sill part 5 is formed in one piece. In addition, the part of the vehicle superstructure 3 on the upper sill part 6 is provided with a further profile part on the upper side, which differs from the embodiment according to FIG. 4.

Figure 7:
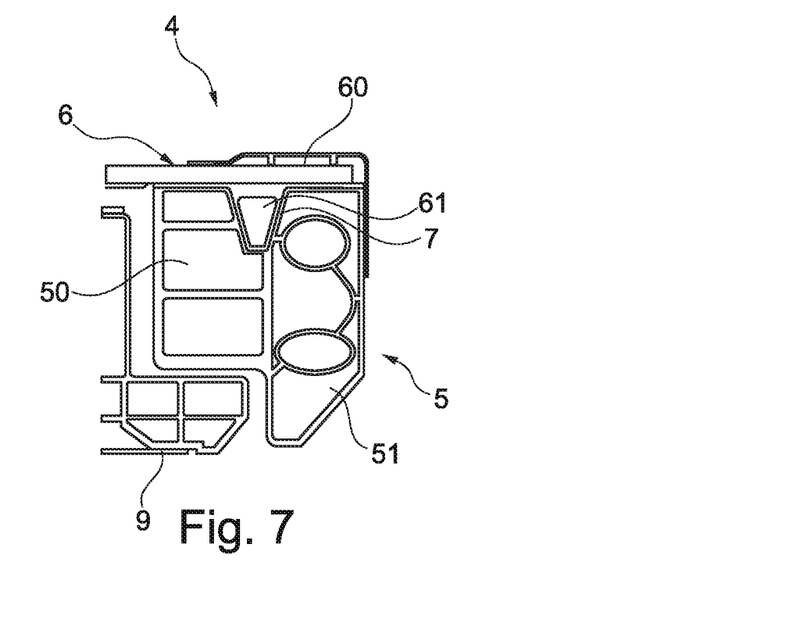
FIG. 7: shows a schematic cross-sectional view through a further embodiment of a sill according to the invention.

FIG. 7 shows a cross-section of another embodiment of the sill 4 according to the invention. Sill 4 differs from sill 4 as shown in FIG. 6 in the design of the upper sill part 6. In the embodiment as shown in FIG. 7, the upper sill part 6 has a plate-shaped main body 60. On the underside of the plate-shaped main body 60 the protrusion 61 is formed. Also in the embodiment as shown in FIG. 7, the protrusion 61 is formed by a hollow chamber. The protrusion 61 also has a trapezoidal cross-section in this embodiment, which tapers downwards. The protrusion 61 protrudes into the recess 7 of the lower sill part 5, which has the same shape as the lower sill part 5 according to FIG. 6.

As shown in FIG. 3, the adhesive layer 10 is not exclusively applied to the lower sill part 5 of the vehicle frame 2.

Rather, in the shown embodiment, adhesive is also applied on the upper side of the parts of the longitudinal beam for the rear area and on the upper side of the cross beams in the rear area. In this way, in addition to the connection between the lower sill part 5 and the upper sill part 6, an adhesive connection can also be made between the vehicle frame 2 in the rear area and the vehicle superstructure in the rear area. This connection is also indicated in FIG. 1.

In the present invention, the sill is divided into an upper and a lower part. For example, the vehicle body is divided into the rolling chassis of an e-mobility vehicle structure, which comprises a ladder-frame, and the vehicle superstructure, which essentially provides the vehicle body pillar structure (sides and doors), roof structure and passenger compartment. In addition to the sill, also other parts of the ladder frame are preferably connected on their upper side to the vehicle superstructure by means of an adhesive layer.

The invention has a number of advantages and can be realized in different embodiments. Because of the recess and the protrusion at the sill parts, a graduated pattern is created and thus an increase in the adhesion surface area, so that in the event of a side pole impact, one sill part is supported by the other and supports or relieves the adhesive connection preferably provided between the sill parts. Preferably the contact of the sill parts and the adhesive connection are full-surface. According to an embodiment, mechanical calibration of the two sill parts can remove extrusion tolerances (outer wall parallelism, torsion, height, width) from the adhesive surfaces. In addition, it is also possible, for example by hydroforming or mechanical calibration of the sill profiles, to form locally defined adhesive surfaces over the length and/or width. Although the invention was essentially described with reference to a sill in which the protrusion is provided at the upper sill part and the recess is provided in the lower sill part, it is also within the scope of the invention to provide the protrusion at the lower sill part and the recess at the upper sill part instead. The connection between the two sill parts is preferably a tension-free connection between the recess and a hollow chamber (tongue and groove). In addition, protrusions defining the adhesion gap, which may, for example, have a height of 0.5 mm, can be provided on one or both sill parts in the adhesion surfaces. Optionally, a battery attachment can be attached to the sill plate, which can be used to attach the batteries of the vehicle, e.g. of an electric vehicle, to the underside of the sill.

REFERENCE CHARACTER LIST 1 vehicle body
10 adhesive layer
2 vehicle frame
20 longitudinal beam
21 cross beam
22 longitudinal beam rear area
23 longitudinal beam front area
3 vehicle superstructure
30 pillar structure
300 A-pillar
301 B-pillar
302 C-pillar
31 roof structure
32 floor element
33 seat cross beams
4 sill
5 lower sill part
50 inner sill profile
500 profile chamber
501 connecting surface
502 bevel
503 partition wall
504 side wall
505 side wall
506 bottom wall
507 passage opening
508 fastening rail
509 screw sleeve
5000 spacer
51 outer sill profile
510 profile chamber
511 connecting surface
512 bevel
513 partition walls
514 side wall
515 side wall
516 bottom wall
517 strut
518 fastening lugs
519 spacer
6 upper sill part
60 main body
61 protrusion
7 recess
8 screw
9 battery holder
90 battery

The invention claimed is:

1. A sill of a vehicle body, comprising a lower sill part and an upper sill part placed on and attached to the lower sill part, wherein the upper sill part is part of a vehicle superstructure, wherein in one side of one sill part of the lower sill part and the upper sill part, which faces the other sill part of the lower sill part and the upper sill part, a recess is provided, and, on one side of the other sill part, which faces the one sill part, a protrusion is provided, wherein a shape of the recess corresponds to a shape of the protrusion and the protrusion interlocks form-fittingly in the recess.

2. The sill according to claim 1, wherein the protrusion is formed by a hollow chamber.

3. The sill according to claim 1, wherein the recess and the protrusion extend in the longitudinal direction of the sill and preferably at least the recess extends over an entire length of the sill.

4. The sill according to claim 1, wherein the sides of the sill parts in which the recess and on which the protrusion are provided lie in a horizontal plane and preferably represent flat surfaces.

5. The sill according to claim 1, wherein each of the recess and the protrusion extend over an entire width of the corresponding one side of the respective sill part.

6. The sill according to claim 1, wherein the recess is provided in the upper side of the lower sill portion and the protrusion is provided on the lower side of the upper sill portion.

7. The sill according to claim 1, wherein the upper and lower sill parts contact each other over an entire surface of the respective one side of the upper and lower sill parts.

8. The sill according to claim 1, wherein the upper and lower sill parts are adhesively connected together.

9. The sill according to claim 8, wherein the sides of the sill parts which face each other represent the adhesion surface and preferably also the contact surface between projection and recess is part of the adhesion surface.

10. The sill according to claim 1, wherein a side of one of the sill parts, which faces the other sill part, a spacer is formed thereon.

11. The sill according to claim 1, wherein the lower sill part comprising an inner and an outer sill profile, which are preferably connected by an adhesion connection which at least partially extends vertically and a snap-in connection.

12. The sill according to claim 11, wherein the recess is formed by bevels on the inner and outer sill profiles.

13. The sill according to claim 1, wherein the lower sill part a fastening lug pointing towards the vehicle or away from the vehicle is formed, which preferably serves for fastening the vehicle superstructure.

14. A vehicle body for a motor vehicle, comprising at least a vehicle frame and a vehicle superstructure, wherein the vehicle body comprises two sills according to claim 1.

15. The vehicle body according to claim 14, wherein the vehicle frame, at least in the region of the lower sill part, is adhesively connected to the vehicle superstructure.

16. A method of manufacturing a vehicle body according to claim 14, wherein the vehicle superstructure is placed on the vehicle frame, wherein, before the vehicle superstructure is placed on the vehicle frame, adhesive is applied to at least part of a contact surface between the upper and lower sill part and the at least one protrusion is introduced into the at least one recess during placement of the vehicle superstructure onto the vehicle frame.

17. The method according to claim 16, wherein at least one of the sill parts is mechanically calibrated.

18. The method according to claim 16, wherein an inner mandrel is moved into a sill part and two press mould halves from the outside are moved together around the sill part, wherein the movement, for the purpose of plastic deformation of the sill part, takes place during and/or after the moving of the press mould halves together.

* * * * *